United States Patent
Richards et al.

(10) Patent No.: US 6,517,748 B2
(45) Date of Patent: Feb. 11, 2003

(54) PHOSPHATE FREE FIRE RETARDANT COMPOSITION

(75) Inventors: Michael J. Richards, Clarence Center, NY (US); Douglas J. Herdman, Colden, NY (US)

(73) Assignee: S-T-N Holdings, Inc., Las Vegas, NV (US)

( * ) Notice: Subject to any disclaimer, the term of this patent is extended or adjusted under 35 U.S.C. 154(b) by 0 days.

(21) Appl. No.: 09/932,904

(22) Filed: Aug. 20, 2001

(65) Prior Publication Data

US 2002/0011593 A1 Jan. 31, 2002

Related U.S. Application Data

(60) Division of application No. 09/577,743, filed on May 23, 2001, now Pat. No. 6,306,317, which is a continuation-in-part of application No. 09/133,689, filed on Aug. 13, 1998, now abandoned.

(51) Int. Cl.[7] .......................... C09K 21/02; C09K 21/10
(52) U.S. Cl. ...................... 252/607; 252/602; 106/18.3; 106/18.32
(58) Field of Search ................................. 252/607, 602; 106/18.13, 18.3, 18.32

(56) References Cited

U.S. PATENT DOCUMENTS

| | | | |
|---|---|---|---|
| 3,897,372 A | 7/1975 | Kehr et al. | 260/2.5 |
| 4,197,235 A | 4/1980 | Nield et al. | 260/45.8 |
| 4,373,010 A | 2/1983 | Oberley | 428/532 |
| 4,514,326 A | 4/1985 | Sallay | 352/602 |
| 4,725,382 A | 2/1988 | Lewchalermwong | 252/607 |
| 4,801,404 A | 1/1989 | Dietrich et al. | 252/607 |
| 4,935,457 A | 6/1990 | Metzner et al. | 524/14 |
| 4,961,865 A | 10/1990 | Pennartz | 252/7 |
| 5,009,964 A | 4/1991 | Leach et al. | 428/526 |
| 5,151,225 A | 9/1992 | Herndon et al. | 252/607 |
| 5,404,555 A | 4/1995 | Liu | 395/800 |

Primary Examiner—Joseph D. Anthony
(74) Attorney, Agent, or Firm—Hodgson Russ LLP

(57) ABSTRACT

A phosphate and ammonia free composition for treating an object (i.e., lumber, plywood and other wood products) is described. The treating solution may be applied to the object by dipping, soaking, brushing, spraying, etc., however, vacuum and/or pressure techniques may be used to impregnate the object according to the method of this invention, including both the empty-cell process and the full-cell process. The composition achieves fire retardant qualities without object degradation when the treated object is subjected to heat and humidity over time. The composition of this invention includes nitrogen in a predetermined ratio to boron.

11 Claims, 2 Drawing Sheets

PHOSPHATE FREE FIRE RETARDANT COMPOSITION

CLAIM OF PRIORITY

This application as a divisional of U.S. patent application Ser. No. 09/577,743 filed May 23, 2001 now U.S. Pat. No. 6,306,317, which as a continuation-in-part application of U.S. patent application Ser. No. 09/133,689 filed Aug. 13, 1998 now abandoned.

FIELD OF THE INVENTION

This invention relates to a fire retardant impregnate for lumber and plywood and other wood products which does not degrade the wood substrate when it is subjected to prolonged high temperatures and humidity.

DESCRIPTION OF THE PRIOR ART

Wood materials used in the construction of, for example, roofs are typically subjected to high temperatures and may also be subjected to high humidity levels. While it is desirable to use pressure treated lumber and plywood and also to treat the same with fire retardant compositions, prior art treated lumber and plywood suffered degradation due to thermal exposure during use. In fact, thermal degradation in roof sheathing and roof truss lumber has been observed within as few as two to five years after installation.

It has been speculated in an article appearing in "The Forest Products Journal," volume 47, No. 6, pages 79–86 (published in 1997) that the presence of phosphorus containing compounds in fire retardant compositions leads to the thermal degradation of the substrate plywood or lumber. Many prior art fire retardant compositions used in treating lumber contain phosphoric acid or reaction products of phosphoric acid such as ammonia phosphate.

It has been hypothesized that the combined affects of phosphate retention in the wood and accumulated thermal exposure result in the formation of phosphoric acid or one of its ionization compounds which, when combined with prolonged heat, degrade the treated wood construction by reacting with wood carbohydrates.

Examples of such prior art fire retardant compositions are shown in U.S. Pat. Nos. 4,373,010; 4,514,326; 4,725,382; 5,009,964 and 5,151,225. These patents all describe proposed commercial fire retardant formulations for the pressure treatment of wood products and all contain phosphoric acid or reaction products of phosphoric acid.

It has been proposed however that the problem of thermal degradation can be solved by eliminating phosphorus containing compounds from wood impregnates and also by eliminating ammonia and ammonia salts of strong acids.

It was further described in the above article that borate-based buffers could mitigate the thermal degradation as an additive to phosphate fire retardant compositions.

In U.S. Pat. No. 4,801,404 a fire retardant composition is described which includes a dispersion of boric acid and a small amount of a borate salt in an aqueous solution. The boric acid is only slightly soluble in water and an alkaline agent was used with the aqueous dispersion to react with the boric acid. Examples of such alkaline agents includes phosphate or ammonia borates.

In U.S. Pat. No. 4,935,457 a fiber board binder is provided which includes as an impregnate a boric acid derivative together with an alcohol and a water soluble amine containing compound. In another example in U.S. Pat. No. 4,961,865, sodium borate is used in combination with sodium chloride, magnesium chloride, sodium sulfate and water as an impregnate for wood and other cellulosic materials.

Further, in U.S. Pat. No. 5,404,555 there is described an impregnate for celluosic materials which includes ammonia sulfate, boric acid, borax, and hydrogen peroxide.

U.S. Pat. No. 4,197,235 discloses a fire retardant polyamide dry composition. In examples 1 through 3 of the '235 patent, boric acid was dissolved in water and poured into a hot solution of melamine in water. The mixture was allowed to cool and the salt filtered off and dried. Then in Example 4, the dry salt composition was mixed with at least a polymer and extruded to form the electrical components. As such, this dry fire retardant material which is a water insoluble product is designed to be incorporated into polymeric materials, not penetrated into wood products.

U.S. Pat. No. 3,897,372 discloses a fire retardant hydrophilic foam composition for polyurethane materials. The foam, as set forth in Examples 3 and 5, comprises polyethylene glycol 1000, trimethylolpropane, 2,4 and 2,6-tolyldiisocyanate, silicone surfactant L-520, water, boric acid, melamine, and, just for example 5, alumina hydrate. The foam of the '372 patent "may be formulated so as to be flexible, semi-rigid, or rigid in nature and to be of primarily open cell or primarily closed cell structure as desired." (Col. 6, lines 25–29) Obviously, this composition is not able to penetrate into a wood product.

None of these prior art references teaches or describes an aqueous, fluid composition for impregnating plywood, cellulosic composite products, or lumber (collectively referred to as "lumber") to provide fire retardant characteristics without thermal degradation which consists of a composition which does not contain compounds of phosphates or ammonia or ammonia salts of dry acids.

SUMMARY OF THE INVENTION

It has been discovered, however, that by eliminating phosphorous containing compounds and ammonia salts of strong acids from an impregnate solution, fire retardant capabilities can be imparted to the structure without the thermal degradation associated with prior art compositions and, in fact, in some tests enhanced strength was exhibited as compared with untreated wood constructions, after prolonged thermal exposure.

The composition of this invention includes nitrogen containing organic compounds and boron containing compounds with the ratio of nitrogen to boron of 1.25:1.00 to 1.75:1.00. Examples of nitrogen containing compounds are dicyandiamide, guanidine, cyanamide, urea, guanylurea, melamine, biuret and mixtures thereof.

Examples of boron compounds are boric acid, metaboric acid, tetraboric acid, boric oxide, and alkaline borates such as sodium octaborate, sodium tetraborate, sodium pentaborate and their hydrates, as well as other metallic salts of boron and oxy acids of boron. A preferred hydrate is sodium octaborate tetrahydrate, a compound commercially available under the trade name "Polybor".

In one preferred embodiment of this invention the nitrogen containing compounds are a mixture of dicyandiamide and urea. Successful tests have been conducted with the composition of this invention wherein the ingredients boric acid, borax, dicyandiamide and urea are present in from about four to about twenty five sixteen percent in an aqueous solution.

Accordingly it is an object of this invention to provide a fire retardant composition for use with lumber, plywood and other wood products which will mitigate thermal degradation when the wood substrate is subject to thermal exposure.

It is another object of this invention to provide a fire retardant treatment for lumber, plywood and other wood products which is phosphate free and free of inorganic ammonia salts of strong acids.

It is another object of this invention to provide a boric acid composition, which is in an aqueous solution, free of phosphates and ammonia salts of strong acids, for use as a fire retardant treatment for lumber, plywood and other wood products, which will not cause thermal degradation of the wood substrate during prolonged thermal exposure.

These and other objects will become readily apparent with reference to the drawings and following description wherein:

DETAILED DESCRIPTION OF THE INVENTION

Figure 1:
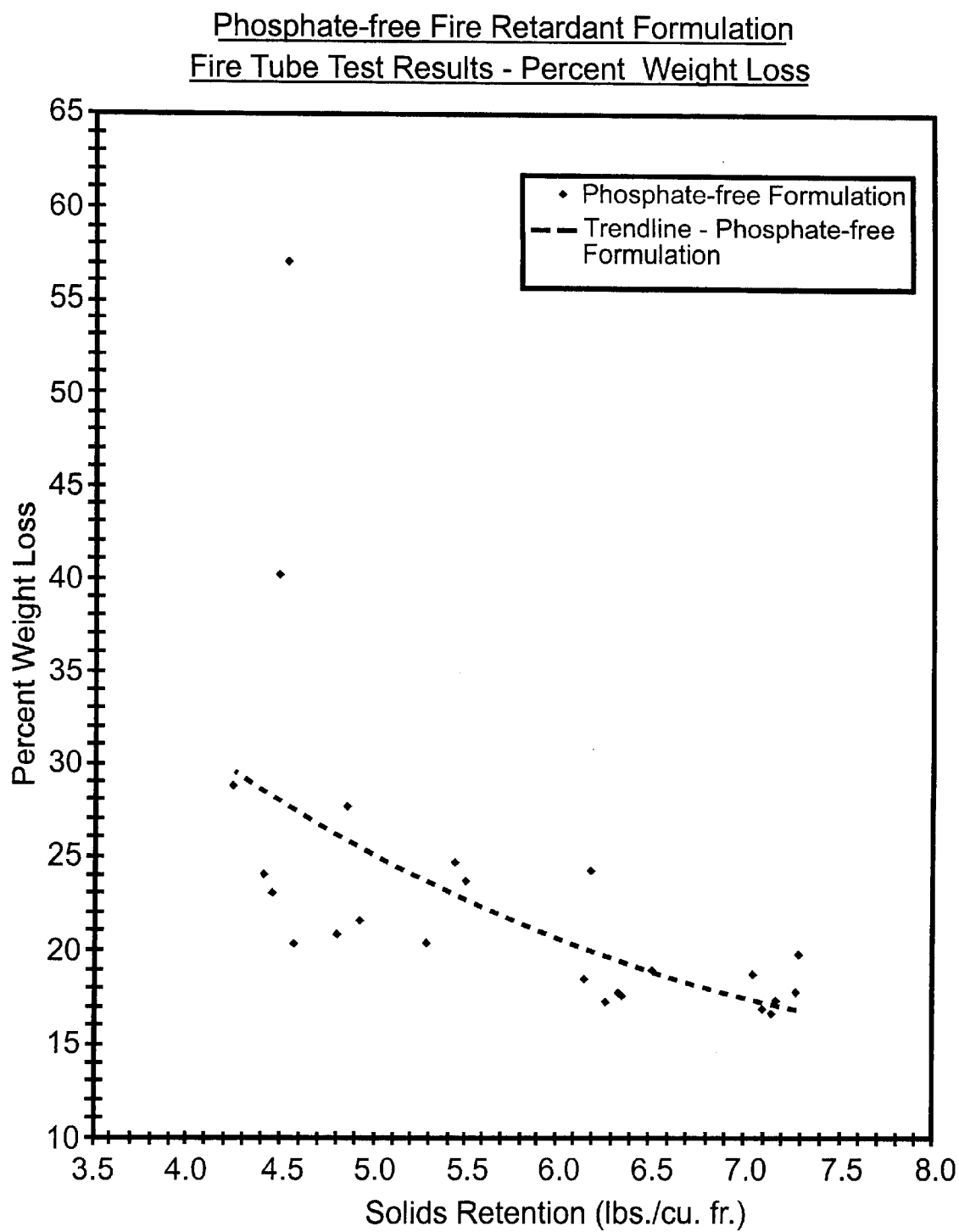
FIG. 1 is a graph depicting percent weight loss versus solids retention for a phosphate free formulation of this invention subjected to fire tube tests.

The formulation of this invention has an ideal composition of 1.5 parts nitrogen to 1.0 part boron in parts by weight. The range in the preferred embodiment is 1.25:1.00 to 1.75:1.00.

In order to evaluate the effectiveness of the phosphate free composition of this invention, blocks of southern pine plywood were vacuum-pressure treated with the formulation of this invention and two different phosphate-containing commercial formulations. These blocks were exposed for sixty days to a temperature of 176 degrees F. and 63% relative humidity. After exposure the pH of the treated wood was measured and compared to matched unexposed specimens. The two phosphate containing formulations showed a pH reduction of, respectively, 1.4 and 1.8 units when compared to the unexposed specimens. The exposed specimens were also very dark and very brittle. The phosphate free formulation had no pH change before or after exposure and the exposed specimens were only slightly darkened and remained sound when compared to the unexposed specimens.

The absence of phosphate or phosphoric reaction products as well as the lack of wood degradation indicates that this phosphate free fire retardant is stable in wood.

Lack of degradation of the wood treated was further shown by scanning electron microscopy observations on the southern pine plywood blocks treated with the phosphate-free formulation of this invention and a phosphate-containing commercial formulation. These observations were made after sixty days exposure of treated blocks to a temperature of 176 degrees F. and 63% relative humidity.

There was no degradation of the middle lamellae on the phosphate-free treated blocks, while severe damage to the middle lamallae was observed with the thermally degraded blocks treated with the phosphate-containing formulation.

The nitrogen containing compounds may be selected from dicyandiamide, guanidine, cyanamide, urea, guanylurea, melamine, biuret and mixtures thereof. And the boron containing compounds may be selected from boric acid, metaboric acid, tetraboric acid, boric oxide, and alkaline borates such as sodium octaborate, sodium tetraborate, sodium pentaborate and hydrates such as disodium octaborate tetrahydrate. From these compounds, the preferred embodiment of this invention is a mixture of boric acid, borax, dicyandiamide, urea and water.

To formulate the composition, the water was heated to 120 degrees F. and the ingredients added with stirring until dissolution occurred. As indicated above the nitrogen to boron ratio was found to be about 1.5:1.0 in the final solution.

A typical 12% solution by weight consisted of 3.0 parts boric acid, 5.4 parts borax, 1.44 parts dicyandiamide and 2.16 parts urea and 88 parts water. A fifteen percent solution was also evaluated where boric acid was present at 5.25 parts, borax 5.25 parts, dicyandiamide 2.25 parts, and urea at 2.25 with 85 parts water. Also, a sixteen per cent solution was prepared of 2.4 parts boric acid, 8.8 parts borax, 1.92 parts dicyandiamide, 2.88 parts urea and 84 parts water. The above formulations all performed in a similar fashion in the evaluation tests conducted.

Table 1 below is a summary of the bending test results of southern pine plywood treated according to the process of this invention, in contrast to untreated, and water-treated southern pine plywood which was pressure treated with water.

TABLE 1

Phosphate-free Fire Retardant Formulation
Summary of Plywood Bending Tests
Southern Pine Plywood

| Treatment | MOR (psi) | exposure time (days) | | | |
|---|---|---|---|---|---|
| | | 0 | 15 | 30 | 60 |
| Water | MC | 10.4% | | | |
| | AVG. | 8,654 | | | |
| | STD | 2,339 | | | |
| Untreated | MC | 9.3% | 8.7% | 8.7% | 8.8% |
| | AVG. | 10,062 | 10,079 | 9,070 | 8,518 |
| | STD | 1,620 | 2,027 | 1,805 | 1,649 |
| Phosphate free | MC | 10.7% | 9.7% | 9.8% | 9.6% |
| | AVG. | 8,936 | 8,825 | 9,719 | 8,767 |
| | STD | 1,739 | 2,247 | 2,240 | 1,778 |
| Ratio: | Treated Untreated | 0.888 | 0.876 | 1.072 | 1.029 |

The term "MC" refers to moisture content and the term "MOR" refers to the modulus of rupture. The results are a measurement of strength after exposure as above identified at 176 degrees F. and 63% relative humidity for 0, 15, 30 and 60 days. As will be evident, the ratio of treated to untreated MOR after thirty and sixty days indicates that the treated sample exhibited a higher MOR than untreated. Thus, no strength degradation was found.

Figure 2:
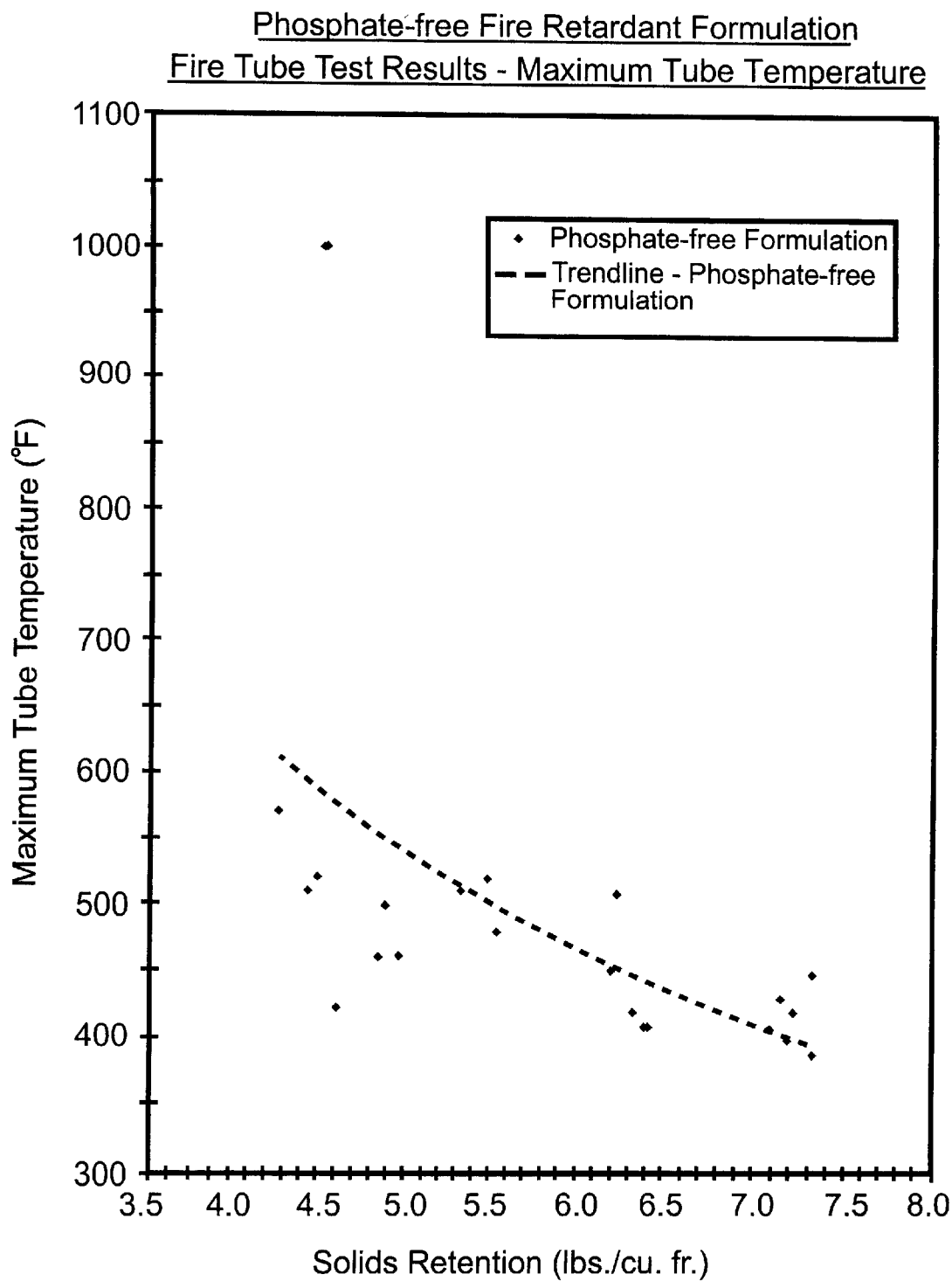
FIG. 2 is a graph depicting maximum tube temperatures versus solids retention for a phosphate free retardant composition of this invention used in wood subjected to fire tube tests.

With reference to FIGS. 1 and 2, these graphs depict values resulting from a fire tube test according to ASTM E-69. The tests measures weight loss and temperature at the top of a 40" fire tube under controlled conditions. A fire tube weight loss of less than 30% and a maximum tube temperature of less than 500 degrees F. is considered to be an acceptable fire retardant formulation for wood products. As shown by these figures, a solids retention above about 5.5 lbs./cu. ft. met the maximum tube temperature and was substantially below the percent weight loss of the above standard.

A better test for a fire retardant formulation is ASTM E-84, the results of which are shown in Table 2. In this test a twenty-four foot section of fire retardant treated wood is installed as the roof of a tunnel. A burner is ignited under controlled combustion conditions and the advance of the flame front down the tunnel is measured over time. The tunnel is calibrated using a value of 100 for untreated red oak and 0 for inorganic cement board. A fire retardant treated wood product traditionally should have a value of 25 or less for both flame spread and smoke developed and in tests of 30 minutes duration, the flame spread did not progress more than 10½ feet beyond the center line of the burner with no evidence of significant progressive combustion.

TABLE 2

Phosphate-free Fire Retardant Formulation
Summary of
ASTM E-84 Surface Burning Characteristics Tests

| Formulation | Species | Calculated Flame Spread | Smoke Developed |
|---|---|---|---|
| Traditional with phosphate | S. pine lumber | 20 | 25 |
|  | D. Fir plywood | 20 | 10 |
| 2nd Generation with phosphate | S. pine lumber | 10 | 25 |
|  | D. Fir plywood | 20 | 20 |
| Modified 2nd Generation | S. pine lumber | 10 | 50 |
|  | D. Fir plywood | 10 | 20 |
| Phosphate-free | S. pine lumber | 6.4 | 1.7 |
|  | D. Fir plywood | 3.9 | 0 |

As shown in Table 2 the flame spread and smoke developed values for the phosphate-free product of this invention in the form of southern pine lumber and Douglas-fir plywood compared very favorably to traditional commercial fire retardants for wood products. A unique and unanticipated feature of the formulation of this invention was a very low smoke value, between 0.0 and 1.7 for these wood products.

While the preferred concentration of boron and nitrogen compounds in the composition of this invention is about 16% by weight in water, 12% is also a practical commercial concentration. A range of 4 or 5 percent up to about 25 percent could be feasible. See Table 3 below.

TABLE 3

Typical solution concentrations by weight of the preferred embodiment of the invention.

| Ingredient | 4% | 5% | 6% | 25% |
|---|---|---|---|---|
| Boric Acid | 1.00 | 1.25 | 1.50 | 6.25 |
| Borax (5 mole) | 1.80 | 2.25 | 2.70 | 11.25 |
| Dicyandiamide | 0.48 | 0.60 | 0.72 | 3.00 |
| Urea | 0.72 | 0.90 | 1.08 | 4.50 |
| H$_2$O | 96.00 | 95.00 | 94.00 | 75.00 |
| Total | 100.0 | 100.0 | 100.0 | 100.0 |

The phosphate-free treatment composition of this invention, when evaluated with southern pine lumber and Douglas fir plywood produced a product that was superior in all aspects to traditional or prior art fire retardant treated lumber and plywood (collectively referred to as lumber), and exhibited better resistance to thermal degradation than untreated lumber after prolonged exposure to heat and humidity. Prior to this invention untreated plywood or lumber was generally regarded as substantially superior in resisting thermal degradation to fire retardant treated lumber and plywood. By eliminating phosphorus containing, compounds and/or, their ammonia reaction products it is believed that the formation of phosphoric acid and other wood degradation products related thereto are eliminated during prolonged exposure to heat and humidity. Therefore the failure of roof sheathing and construction lumber which has been pressure treated with a fire retardant composition associated with the prior art is eliminated by the composition of this invention. In the preferred embodiment the composition of this invention uses organic amines as a nitrogen source with boron containing compounds in a ratio of 1.5:1.0. The preferred composition uses both boric acid and borax (sodium tetraborate)together with a mixture of dicyandiamide and urea in aqueous solution.

The treating solution may be applied to the wood by dipping, soaking, brushing, spraying, etc., however, vacuum and/or pressure techniques may be used to impregnate the wood according to the method of this invention, including both the empty-cell process and the full-cell process, which are well known to those skilled in the art.

Wood is a hygroscopic substance; i.e., it has an affinity for water and other polar liquids in both liquid and vapor form. Whether wood absorbs or loses water vapor depends on the temperature and humidity of the surrounding atmosphere. As a consequence the moisture content fluctuates with changes in atmospheric conditions around it.

The hygroscopic properties of wood and wood-based products treated with fire-retardant chemicals are often greater than for untreated products. Additionally, a fire retardant formulation containing over 15% urea has been reported to be hygroscopic. In this connection, urea by itself is hygroscopic and one would expect the wood treated with the fire retardant composition of this invention to be hygroscopic as the formulation can contain in excess of 15% urea on a total solids basis.

The hygroscopic properties of southern pine lumber treated with the fire retardant composition of this invention were evaluated. The tests were conducted in accordance with ASTM D3201-94 to verify conformance of the fire retardant composition of this invention to Section 2.2.2.1 of AWPA Standard C20-99, Structural Lumber-Fire Retardant Treatment by Pressure Process, that specifies that material shall have an equilibrium moisture content of not over 28% when exposed under constant humidity conditions of 92±2% at 27±2° C. for 10 days. (The AWPA Standards are standard procedures promulgated by and under the jurisdiction of the American Wood Preservers' Association. AWPA standard methods are well known to those of ordinary skill in the art of wood preservation, and further details of the published methods are readily available.)

Table 4 represents a summary comparison of the hygroscopic properties of southern pine lumber treated with the fire retardant composition of this invention and untreated matched specimens. It was discovered through this testing that the fire retardant composition of this invention exhibited a unique and unexpected attribute by equilibrating at a moisture content of not over 28% when tested in accordance with ASTM D3201-94 at 92±2% relative humidity. Furthermore, it was not obvious or anticipated that southern pine lumber treated with the formulation of this invention exhibits only a very slight difference in final moisture content over matched, untreated southern pine lumber. Thus, the combination of urea with dicyandiamide, boric acid and borax, results in the formation of a compound or compounds which have low hygroscopicity.

TABLE 4

| #/cu. ft. | Final Moisture Content (%) | | Difference |
|---|---|---|---|
| Actives | Untreated | Treated | (%) |
| 2.78 | 17.06 | 18.46 | 1.40 |

Metal fasteners are widely used for joining various wood, cellulosic composite products, and wood based products in both structural and nonstructural applications. It is well known that most metals may corrode faster in direct contact with wood, whether treated or not, than they would when exposed in a normal atmosphere. The moisture content of the wood also plays a major role for the corrosion of metals within or in contact with the wood.

Due to the relatively high loading of inorganic flame retardant salts and the hygroscopic nature of many fire retardant technologies, the potential for corrosion is often greater for wood and wood based products treated with fire-retardant chemicals than for untreated products.

The corrosive properties of various metals in contact with southern pine lumber treated with the fire retardant composition of this invention were also studied. The tests were conducted in accordance with AWPA Standard E12-94, Standard Method of Determining Corrosion of Metal In Contract With Treated Wood, and ASTM G1-90. This accelerated test procedure exposes metal samples between treated wood wafers at set conditions of 49±1° C. and a relative humidity of 90±1% for a period of 10 days. The corrosion rate in mils per year is calculated from the data. Fontana's "Corrosion Engineering, 3$^{rd}$ Ed." gives the following guide for evaluating corrosion rates:

| Relative Corrosion Rate | Mils/Year |
|---|---|
| Outstanding | <1 |
| Excellent | 1–5 |
| Good | 5–20 |
| Fair | 20–50 |
| Poor | 50–200 |
| Unacceptable | >200 |

Table 5 represents a summary comparison of the corrosion rates of various metals in contact with southern pine lumber treated with the fire-retardant composition of this invention and untreated matched specimens. It was discovered through this testing that the fire-retardant composition of this invention exhibited a unique and unexpected attribute by producing "excellent" corrosion rates between 1 and 5 mils per year for SAE 1010 Steel and Hot-Dipped Galvanized Steel, and "outstanding" corrosion rates of less than 1 mil per year for Aluminum, Copper and Red Brass. Furthermore, it was not obvious or anticipated that southern pine lumber treated with the formulation of this invention produces only slight differences in corrosion rates of tested metals over matched, untreated southern pine lumber.

TABLE 5

| | Corrosion Rate (mils/year) | | |
|---|---|---|---|
| Material Tested | Untreated | Fire Retardant Treated | Difference (mils/year) |
| SAE 1010 Steel | 1.658 | 2.442 | 0.784 |
| Hot-Dipped Zinc Galvanized Steel | 2.305 | 3.039 | 0.734 |
| Aluminum | 0.672 | 0.735 | 0.063 |
| Copper | 0.223 | 0.270 | 0.047 |
| Stainless Steel | 0.048 | 0.082 | 0.034 |
| Red Brass | 0.166 | 0.361 | 0.195 |

Further accelerated laboratory corrosion tests were conducted where SAE 1010 Steel and Hot-Dipped Galvanized Steel nails were embedded in southern pine lumber treated with the fire-retardant composition of this invention and water treated matched specimens. Embedded nails were exposed to conditions of 49±1° C. and a relative humidity of 90±1% for a period of 60 days.

Table 6 represents a summary comparison of the percent weight loss of SAE 1010 Steel and Hot-Dipped Galvanized Steel nails in contact with southern pine lumber treated with the fire-retardant composition of this invention and water treated matched specimens. It was discovered through this testing that the fire retardant composition of this invention experienced a unique and unexpected attribute by producing lower weight loss values for both SAE 1010 Steel and Hot-Dipped Galvanized Steel nails than like nails embedded in water treated controls.

TABLE 6

| | Weight Loss (%) | | |
|---|---|---|---|
| Material Tested | Water Treated | Fire Retardant Treated | Difference (%) |
| SAE 1010 Steel | 2.65 | 1.06 | −1.59 |
| Hot-Dipped Zinc Galvanized Steel | 1.56 | 0.56 | −1.00 |

Impregnating wood, cellulosic composite products, or wood products with fire retardant chemicals, and subsequent redrying, can affect the strength properties of the treated wood. Wood treated with currently available commercial fire retardant formulations experience a 10 to 20 percent loss in initial bending strength due to fire retardant treatment and redrying. In-service temperature and relative humidity conditions can also have an adverse effect on wood strength properties.

It is well known that all wood, cellulosic composite products and wood products are inherently prone to strength loss from extended exposure to temperature above 150° F. Fire retardant treatments have the potential to accelerate thermal degrade and associated strength loss. Phosphate containing fire retardant formulations are one such group of treatments that have the potential to accelerate thermal-induced degradation. It has been suggested that the combined effects of phosphate retention and accumulated thermal exposure, from both redrying and in-service high temperatures, are additive and cumulative (Winandy, J. E. 1997. Effects of Fire Retardant Retention, Borate Buffers, and Redrying Temperature After Treatment On Thermal-Induced Degradation. Forest Prod. J. 47 (6): 79–86). In the United States, thermal degradation has occurred in the field with fire-retardant-treated plywood roof sheathing and roof-truss lumber in as few as two to five years after installation when treated with phosphate containing formulations.

Currently available commercial fire retardant treatments all experience additional reductions in mechanical properties do to thermal-induced degradation. Currently no phosphate-free fire retardant formulations for wood, wood products, or cellulosic composite materials exists in the commercial market.

An extensive strength testing program to evaluate the initial strength effects of the composition of this invention on treated lumber and plywood and to access its potential for in-service thermal-induced strength loss resulting from high-temperature exposure was conducted. This testing included the evaluation of:

1) Douglas-fir plywood as required in ASTM D5516-96, and
2) Small, clear specimens of Douglas-fir, white spruce, and southern pine as specified in Methods A and B of ASTM D5664-95.

These two test methods are designed to assess the initial adjustments to allowable design stresses for lumber and plywood treated with candidate commercial fire retardant formulations and further procedures for obtaining data to assess the effect of extended exposure to elevated temperatures.

It was discovered through this testing that the treatment of Douglas-fir plywood with the composition of this invention resulted in no initial treatment effect on Modulus of Elasticity (MOE) or on maximum load carrying capacity. This testing also revealed that the initial treatment effect on bending strength (MOR) is less than that associated with currently available commercial fire retardants. It was further discovered through this testing that Douglas-fir plywood treated with the composition of this invention exhibited a unique and unexpected attribute by showing no indications and no significant potential to experience in-service reductions in mechanical properties when exposed to elevated temperatures at any differential rate than matched untreated plywood.

When testing small, clear specimens of Douglas-fir, white spruce and southern pine lumber, it was found that there was no initial treatment effect on MOE, Maximum crushing strength (MCS) or Shear. The initial treatment effect on MOR and Ultimate Tensile Strength is less than that associated with other commercially available fire retardant formulations and only about half of what is specified under AWPA Standard C-20:Section 4.1 requirements. Similar to Douglas-fir plywood, it was discovered through this testing that lumber treated with the composition of this invention exhibited a unique and unexpected attribute by showing no consistent indications nor potential to experience in-service reductions in mechanical properties when exposed to elevated temperatures at any differential rate than matched untreated lumber.

Previous testing with Borax-Boric acid based formulations has shown the development of brashness (e.g., embrittlement) in the treated material that seemingly affected the fracture mechanics and the ductility of wood material treated to high borate retentions. A basic assumption of wood engineering design is that wood will react more like a ductile material than like a brittle material and this assumption appeared to be violated when considering previous borate-based fire retardants. It was discovered through this strength-testing program that wood treated with the fire retardant composition of this invention exhibits a unique and unexpected attribute by showing no noticeable visual changes in the appearance or characteristics of the fracture surfaces when compared to untreated wood. Thus, these results of unchanged fracture mechanisms provide support for the application of simple and direct engineering adjustment factors rather the major alterations in engineering practice because of perceptions for increased brittleness.

Examples 1–9 below, illustrate methods for preparing alternative versions of the inventive composition. The methods described in these examples are illustrative only, and are not intended to limit the scope of the invention in any manner.

EXAMPLE 1

A 5.0% aqueous fire retardant solution is prepared from 0.85 parts cyanimide, 1.00 part tetraboric acid, 2.25 parts 5 mole sodium tetraborate, 0.90 parts urea and 95.0 parts water. The water is heated to 120° F., while stirring, the cyanimide, 5 mole sodium tetaborate, tetraboric acid and urea are added, and the blend is stirred until all of the components are in solution. The resulting nitrogen:boron ratio is 1.62:1. The solution is then allowed to cool to room temperature.

EXAMPLE 2

An 8.0% aqueous fire retardant solution is prepared from 0.96 parts dicyandiamide, 4.00 parts 10 mole sodium tetraborate, 1.84 parts metaboric acid, 1.20 parts guanylurea and 92.0 parts water. The water is heated to 120° F. while stirring, the dicyandiamide, 10 mole sodium tetraborate, metaboric acid and guanylurea are added, and the blend is stirred until all of the components are in solution. The resulting nitrogen:boron ratio is 1.45:1. The solution is then allowed to cool to room temperature.

EXAMPLE 3

A 12.0% aqueous fire retardant solution is prepared from 1.80 parts dicyandiamide, 6.00 parts 10 mole sodium tetraborate, 2.40 parts boric oxide, 1.80 parts guanidine sulfate and 88.0 parts water. The water is heated to 120° F., while stirring, the dicyandiamide, 10 mole sodium tetraborate, boric oxide and guanidine sulfate are added, and the blend is stirred until all of the components are in solution. The resulting nitrogen:boron ratio is 1.36:1. The solution is then allowed to cool to room temperature.

EXAMPLE 4

A 16.0% aqueous fire retardant solution is prepared from 1.76 parts melamine, 7.36 parts sodium pentaborate, 4.00 parts boric acid, 2.88 parts urea and 84.0 parts water. The water is heated to 120° F. while stirring, the melamine, sodium, pentaborate, boric acid and urea are added, and the blend is stirred until all of the components are in solution. The resulting nitrogen:boron ratio is 1.25:1. The solution is then allowed to cool to room temperature.

EXAMPLE 5

A 13.0% aqueous fire retardant solution is prepared from 1.95 parts dicyandiamide, 6.5 parts disodium octaborate tetrahydrate (DOT), 2.6 parts 5 mole sodium tetraborate, 1.95 parts urea and 87.0 parts water. The water is heated to 120° F. while stirring, the dicyandiamide, DOT, 5 mole sodium tetraborate and urea are added, and the blend is stirred until all of the components are in solution. The resulting nitrogen:boron ratio is 1.27:1. The solution is then allowed to cool to room temperature.

EXAMPLE 6

A 13.0% aqueous fire retardant solution is prepared from 1.95 parts dicyandiamide, 5.2 parts DOT, 3.9 parts boric acid, 1.95 parts urea and 87.0 parts water. The water is heated to 120° F. while stirring, the dicyandiamide, DOT, boric acid and urea are added, and the blend is stirred until all of the components are in solution. The resulting nitrogen:boron ratio is 1.25:1. The solution is then allowed to cool to room temperature.

EXAMPLE 7

The 13.0% fire retardant solution prepared in Example 5 was used to vacuum-pressure treat southern yellow pine fire tube sticks (3/8"×3/4"×40"). an initial vacuum of 28" of mercury for 20 minutes was used, followed by the addition of the 13.0% treating solution to the retort. A pressure of 120 psi was then applied to the treating solution for a period of 30 minutes. The southern pine samples were dried overnight at 49° C., conditioned to a moisture content between 4.0% and 10.0%, and fire tested in accordance with ASTM E-69, Standard Test Method for Combustible Properties of Treated Wood by the Fire Tube Apparatus. This test evaluates the properties of wood, lumber, and cellulosic composite materials in response to heat and flame under controlled laboratory conditions. Parameters measured with this test are weight loss, maximum tube temperature, flame out time and char height. Wood treated with an effective commercial fire retardant will experience a weight loss of less than 30.0% and a maximum tube temperature of less than 500° F. when subjected to the ASTM E-69 fire tube test. The test data is summarized in Table 9 and shows that the wood treated with the fire retardant composition treating solution of this invention has good fire retardant properties.

TABLE 9

| Treatment | #/cu.ft. actives | Weight Loss (%) | Maximum Tube Temp. (° F.) | Flame Out Time (min.) | Char Height (in.) |
|---|---|---|---|---|---|
| 13.0% nitrogen/boron | 5.8 | 18.2 | 424 | 0 | 19 |
| Untreated | 0.0 | >69.0 | >800 | >5 | 40 |

EXAMPLE 8

Southern pine fire tube sticks were treated with the 13.0% fire retardant solution prepared in Example 6 and tested for fire retardancy according to ASTM E-69. The test data is summarized in Table 10 and shows that the wood treated with the fire retardant composition treating solution of this invention has good fire retardant properties.

TABLE 10

| Treatment | #/cu.ft. actives | Weight Loss (%) | Maximum Tube Temp. (° F.) | Flame Out Time (min.) | Char Height (in.) |
|---|---|---|---|---|---|
| 13.0% Nitrogen/boron | 5.99 | 21.2 | 451 | 0 | 22 |
| Untreated | 0.0 | >69.0 | >800 | >5 | 40 |

The term "aqueous solution" does not refer to a solid precipitate or foam, which are entirely distinct characteristics than an aqueous solution. Instead, it refers to a solution having the ability to be sprayed upon the lumber, as set forth in the above description and examples. The term "lumber" refers to all wood and cellulosic composite products. Examples of cellulosic composite products include particle boards, orientated strand boards, fibre boards, and other engineered wood products. When dealing with lumber, it is an advantage not to have the lumber get warped, expand or make more flammable. Therefore, alcohols, which are flammable, are avoided in the instant composition.

EXAMPLE 9

An alternative embodiment of Example 1 is when a conventional fluid, non-flammable (i.e., no alcohol product) adhesive, such as those made by H. B. Fuller of Vadnais Heights, Minn., is added to the fire-retardant composition. The resulting aqueous, phosphate-free, fire retardant aqueous solution is applied, i.e., by a spray, to cellulosic composite materials. The cellulosic composite materials are then pressed together at high pressures and temperatures. If the aqueous solution had a phosphate containing material, then the phosphate under the high pressures and temperatures of forming the cellulosic composite material could convert into phosphoric acid, which is a known deteriorating agent of lumber products.

It will be readily seen by one of ordinary skill in the art that the present invention fulfills all of the objects set forth above. After reading the foregoing specification, one of ordinary skill will be able to effect various changes, substitutions or equivalents and various other aspects of the invention as broadly disclosed herein. It is therefore intended that the protection granted hereon be limited only by the definition contained in the appended claims and equivalents thereof.

We claim:

1. A method of impregnating an object with a fire retardant solution consisting essentially of:
   an aqueous solution, free of phosphates, ammonia, and salts thereof, having nitrogen and boron containing compounds together so the nitrogen and boron are dissolved therein and having a ratio of nitrogen to boron ranging from 1.25:1 to 1.75:1 by weight;
   wherein said aqueous solution is applied to the object in order for the aqueous solution to penetrate into the object and to render the object fire retardant.

2. The method of claim 1 wherein the boron compound contained in solution is selected from the group consisting of boric acid, metaboric acid, tetraboric acid, boric oxide, alkaline borates and their hydrates, metallic salts and oxy acids of boron and mixtures thereof.

3. The method of claim 1 wherein the nitrogen compound contained in solution is selected from the group consisting of dicyandiamide, guanidine, cyanamide, urea, guanylurea, melamine, biuret and mixtures thereof.

4. The method of claim 1 wherein the boron and nitrogen containing compounds are present at a concentration from about 4% to about 25% by weight of said aqueous solution.

5. The method of claim 1 wherein the boron and nitrogen containing compounds are present at a concentration from about 12% to about 16% by weight of said aqueous solution.

6. The method of claim 1 wherein the object is lumber.

7. The method of claim 1 wherein the boron containing compounds are boric acid and borax.

8. The method of claim 7 wherein said boron containing compounds are present at a concentration from about 2.8% to about 17.5% by weight of said aqueous solution.

9. The method of claim 7 wherein said nitrogen containing compounds are dicyandiamide and urea.

10. The method of claim 9 wherein said nitrogen containing compounds are present at a concentration from about 1.2% to about 7.5% by weight of said aqueous solution.

11. A method of impregnating an object with a fire retardant solution consisting essentially of:

an aqueous solution, free of phosphates, ammonia, and salts thereof, having nitrogen from nitrogen containing compounds selected from the group consisting of dicyandiamide, guanidine, cyanamide, urea, guanylurea, melamine, biuret, and mixtures thereof and boron containing compounds selected from the group consisting of boric acid, metaboric acid, tetraboric acid, boric oxide, alkaline borates, and their hydrates, metallic salts and oxy acids of boron and mixtures thereof together so the nitrogen and boron are dissolved therein and having a ratio of nitrogen to boron ranging from 1.25:1 to 1.75:1 by weight;

wherein said aqueous solution is applied to the object in order for the aqueous solution to penetrate into the object and to render the object fire retardant.

* * * * *

UNITED STATES PATENT AND TRADEMARK OFFICE
CERTIFICATE OF CORRECTION

PATENT NO.      : 6,517,748 B2
DATED           : February 11, 2003
INVENTOR(S)     : Richards et al.

It is certified that error appears in the above-identified patent and that said Letters Patent is hereby corrected as shown below:

Title page,
Item [60], Related U.S. Application Data, please delete "May 23, 2001" and insert -- May 23, 2000 --.

Column 1,
Line 2, please delete "May 23, 2001" and insert -- May 23, 2000 --.

Column 6,
Line 10, after "(sodium tetraborate)" please insert a space.

Column 7,
Line 33, please delete "Contract" and insert -- Contact --.

Column 10,
Line 18, please delete "tetaborate" and insert -- tetraborate --;
Line 52, please delete "sodium, pentaborate" and insert -- sodium pentaborate --.

Signed and Sealed this

Fifteenth Day of July, 2003

JAMES E. ROGAN
*Director of the United States Patent and Trademark Office*